United States Patent Office 3,502,586
Patented Mar. 24, 1970

3,502,586
PROCESS OF REGENERATING FLUOROCARBON EMULSIONS
Albert W. Bauer and Howard E. Phillips, Wilmington, Del., assignors to E. I. du Pont de Nemours and Company, Wilmington, Del., a corporation of Delaware
No Drawing. Filed Aug. 31, 1966, Ser. No. 576,215
Int. Cl. B01d 15/00; B01j 13/00
U.S. Cl. 252—153                                   5 Claims

ABSTRACT OF THE DISCLOSURE

A process for removing water from a water-in-oil emulsion without breaking the emulsion, which process comprises contacting an emulsion containing about 0.25–25 weight percent, but not greater than a saturation amount, of water, about 0.1–30 weight percent of isopropylammonium dodecylbenzenesulfonate, and at least 30 weight percent of a fluorochlorocarbon having a boiling point of 70–200° F., for example, 1,1,2-trichloro-1,2,2-trifluoroethane, with silica gel drying agent, and thereafter separating the silica gel and the regenerated emulsion.

---

Emulsions containing two or more otherwise immiscible components and a surface active agent forming a stable dispersed system are well known and broadly used in industry. The surface active agent serves as a link to keep one of the immiscible components dispersed in the other. Often these emulsions contain a water phase and a so-called oil phase consisting of some organic compound, such as a fluorocarbon having a boiling point between 70° F. and 200° F., i.e., trichlorofluoromethane, dichlorotetrafluoroethane, and trichlorotrifluoroethane. One such water-in-oil emulsion comprises from about 0.25% to about 25% by weight water, from about 0.1% to about 30% by weight isopropylammonium dodecylbenzenesulfonate, at least about 30% by weight 1,1,2-trichloro-1,2,2-trifluoroethane and optionally from about 0% to about 5% by weight ammonia. An emulsion consisting on a weight basis of 6% of water dispersed in 91.5% of 1,1,2-trichloro-1,2,2-trifluoroethane containing 2.5% of isopropylammonium dodecylbenzenesulfonate as a dispersing agent is a commercial water-in-oil emulsion which is particularly useful for removing water and contaminants from the surface of intricate parts of equipment and apparatus that must be cleaned and thoroughly dried before some further processing or cleaning operation is undertaken. The emulsion readily wets the surfaces that are to be cleaned and dried and disperses within itself any contaminants, soils, water or moisture present. The emulsion is drained away carrying the water and contaminants with it, and then the surfaces are rinsed with pure trichlorotrifluoroethane to remove residues containing water and at the same time all traces of the surfactant. The parts and apparatus so treated are left completely clean and dry.

The surfactant used in the above-described emulsions has a total water suspending capacity of approximately three times its weight. Hence, the commercial emulsion containing 2.5% of isopropylammonium dodecylbenzenesulfonate has a total water capacity of about 9%. Additional water above the 9% saturation limit of the commercial emulsion will separate and form a layer which rises to the top consisting mainly of water with small amounts of surfactant and trichlorotrifluoroethane. The amount of surfactant in this water layer is considerably less than contaminants are present, since the contaminants have a tendency to force the organic surfactant back into the emulsion. When the emulsion has thus become saturated with water or spent with respect to performing as a drying agent, it must be discarded or regenerated by removing the excess water therefrom.

To discard an emulsion containing an undesirably high amount of water results in an increase in the cost of this mode of drying and as such is uneconomical. Recovery of the more valuable organic component, such as the trichlorotrifluoroethane, may be effected by distillation. However, distillation results in the loss of the surfactant and a significant material loss of the organic component itself. In addition, the operating cost of distillation and makeup of a fresh emulsion make recovery by distillation a very undesirable procedure.

Contacting the water-laden emulsion with drying agents has not met with universal success. For example, drying grade alumina, referred to as alumina gell, causes the formation of a gelatinous water phase that is troublesome to remove from the fluorocarbon phase. This results from the fact that the stabilizing surfactant is also adsorbed and stays with the water on the adsorbing surface of the alumina gel thereby destroying emulsion stability. Passage of the moisture-saturated water-in-oil emulsion through molecular sieves indicated that molecular sieves possess too low a water capacity to be useful in regenerating water-in-oil emulsions.

Accordingly, the present invention is directed to a process for regenerating water-in-oil emulsions by removing water therefrom which process comprises contacting the emulsion with silica gel and thereafter separating the regenerated emulsion from the silica gel.

Surprisingly it has been found that silica gel is selective in that, unlike alumina gel, the silica gel adsorbs only the excess water, thereby maintaining a stabilized emulsion. Thus, on removal of water from the emulsion by the silica gel, there is no significant loss of surfactant as long as the water content has not exceeded the saturation limit of the emulsion. Consequently, emulsion stability is not affected adversely by contact with the silica gel, and the regenerated emulsion can be separated very easily from the silica gel.

Silica gel is especially advantageous for reducing the water content of emulsions for several reasons. Its unexpected high degree of selectivity for water in preference to surfactant has already been discussed. Among its other advantages are (1) its rapid adsorption of water from the emulsion at room temperature, (2) its high capacity for water, a pickup of about 30% by weight is normal, (3) its ease of regeneration by oven drying or with hot dry air, and (4) its low material cost.

Commercial silica gel in the form of granules varying in size from about 2 to about 50 mesh can be used for the invention process. However, commercial silica gel granules of from about 6 to about 16 mesh size are preferred for their ready availability, ease of handling and regeneration, and the high emulsion flow rate maintainable with them.

The silica gel which contains adsorbed water is readily dried in a hot air oven or in contact with a hot air stream passing through a bed of the material. A pure trichlorotrifluoroethane rinse is usually used prior to the regeneration of the silica gel to remove any contaminants and non-volatile materials from the gel particles.

The water-in-oil emulsion saturated with water or containing lesser amounts of water may be brought into contact with the dry silica gel as a batch operation. After a time interval sufficient to reduce the water content of the emulsion to the desired predetermined level, the emulsion is easily separated from the silica gel by filtration. It is definitely preferred to regenerate the emulsion before it has exceeded its water saturation limit. If the water saturation limit of the emulsion is surpassed, the present invention can still be used to regenerate the emulsion. However, when the water content exceeds saturation, the separate water layer contains surfactant which deposits with the water on the silica gel. Surfactant deposits on the gel make regeneration more difficult. Surfactant deposit on the gel does not occur when the water is removed prior to the breakdown of the emulsion and thus, for this reason, it is preferred to regenerate the emulsion prior to breaking. Although batch operation is used, it is preferable to provide for a continuous passage of the water-in-oil emulsion to be regenerated through a bed of silica gel. In one embodiment of the invention, the emulsion is pumped through a glass or stainless steel column which holds the silica gel. The charge of silica gel for a given column amounts to about 0.034 pound of silica gel per pound of emulsion per one percent of water to be removed. The rate of circulation of the bath contents and the size of the silica gel cartridge are adjusted so that the water is removed from the emulsion at about the same rate the water is introduced by the work. In the preferred application, the water concentration in the emulsion is maintained between 3% and 9% and a flow rate of between one and two bath turnovers per hour is used. Two columns of silica gel are usually made available to enable continuous operation. When one column has been used to its capacity in the sense that the silica gel therein has become saturated with adsorbed water, it is isolated as the flow of emulsion is switched to the second column. While the emulsion is being passed through the second column, the contents of the first column are rinsed with pure trichlorotrifluoroethane to free the contents of the column from any residual contaminants. The trichlorotrifluoroethane is then allowed to drain from the column. The column is thereafter regenerated by a stream of hot air as indicated above.

Any temperature rise in the silica gel bed during the flow of the water-laden emulsion can be prevented or controlled by water jacketing the columns and running cooling water through the jackets. The emulsion which is collected after passing through the columns has a reduced water content and is ready for further use.

Representative examples of the present invention are illustrated below. All parts and percentages are by weight unless otherwise specified.

EXAMPLE 1

Fifteen parts of 6- to 16-mesh silica gel were mixed with stirring into 100 parts of a water-in-oil emulsion containing 6.5% of water dispersed in a solution of 90.84% 1,1,2-trichloro-1,2,2-trifluoroethane containing 2.66% isopropylammonium dodecylbenzenesulfonate as surfactant. The mixture was allowed to stand for 15 minutes at room temperature. The emulsion was then filtered from the silica gel and analyzed for its content of water and surfactant. The water content was reduced to 5.0% while the surfactant content remained unchanged.

The water content was measured by the Karl Fischer Method as described by Smith, D.M., Aquametry, Interscience publishers, vol. 5 (1948). The analysis for the surfactant was conducted as follows. A weighed sample of 0.15 gram of emulsion was added to 25 ml. of chloroform in a glass-stoppered graduate together with 25 ml. of distilled water containing one drop of 0.5% methylene blue solution. The mixture was shaken, whereupon the blue color transferred to the chloroform layer owing to laking with the anionic surfactant. In increments of 0.5 ml., a solution of 0.020% of cetyl pyridinium chloride (CPC) in distilled water was then added, followed each time by shaking. The distribution of color between the layers after each addition of CPC solution used was noted. When the color was evenly distributed between the layers, the total mls. of CPC solution used was recorded. The relation between the CPC solution used and the amount of surfactant present is:

| Ml. CPC solution: | Mg. surfactant |
|---|---|
| 1 | 0.4 |
| 2 | 0.6 |
| 4 | 1.0 |
| 9 | 2.0 |
| 14 | 3.0 |
| 19 | 4.0 |

The percent of surfactant in the sample taken is given by the expression: mg. surfactant/g. sample $\times 10$.

When 25 parts of silica gel were used in the above procedure, the water content of the emulsion was reduced to 4%. The surfactant concentration in the chlorofluoroethane remained unchanged. Again, with 50% silica gel present in the emulsion, the water content was decreased from 6.5% to 1.6% and still no change in the surfactant concentration occurred.

EXAMPLE 2

A glass column fitted with a bottom stopcock and wire mesh screen held just above the stopcock was charged with 100 g. of dry 6- to 16-mesh silica gel and 600 ml. of a water-in-oil emulsion essentially the same as that of Example 1. The emulsion was allowed to flow continuously through the bed of silica gel with collection of 100 ml. samples which were analyzed for water and surfactant content. The contact time of each aliquot with the silica gel was about 5 minutes. The results of the analyses were as follows:

| Water-in-oil emulsion taken | Water content, percent by wt. | Surfactant content, percent by wt. |
|---|---|---|
| Control, original material | 6.30 | 2.6 |
| 1st 100 ml | 0.01 | 2.9 |
| 2nd 100 ml | 0.39 | 2.3 |
| 3rd 100 ml | 2.18 | 2.6 |
| 4th 100 ml | 3.68 | 2.6 |

A marked reduction in the water content of the emulsion occurred during contact with the silica gel under these conditions and the surfactant concentration relative to the trichlorotrifluoroethane remained essentially unchanged. The silica gel was then washed with about 100 ml. of pure tricholoro trifluoroethane, dried overnight in a 110° C. oven, and used to recharge the column. A fresh 600 ml. portion of water-in-oil emulsion containing 6.2% water was allowed to run through the silica gel as before. This procedure was repeated three times, with the exception that three hours was the duration of the oven time for the last two dryings. The following results were obtained with the samples collected during the passage of the emulsion over the silica gel after it has been regenerated for the fourth time.

| Water-in-oil emulsion taken | Water content, percent by wt. | Surfactant content, percent by wt. |
|---|---|---|
| Control, original material | 6.2 | 2.6 |
| 1st 100 ml | 0.01 | 3.2 |
| 2nd 100 ml | 0.01 | 2.6 |
| 3rd 100 ml | 1.67 | 2.7 |
| 4th 100 ml | 5.12 | 2.6 |

The flow during the fourth passage was somewhat slower than during the previous cycles owing to a finer particle size of the silica gel which results from repeated handling. Drying of the silica gel in situ with a hot air stream would prevent or reduce the subdivision of the silica granules. The results obtained clearly show, however, that silica gel is capable of many repetitive uses, retaining its water adsorbing capacity for a long period of time. Thus, the silica gel is unimpaired and does not become contaminated and fouled with surfactant by repeated use.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for removing water from a water-in-oil emulsion without breaking the emulsion, which process comprises contacting an emulsion containing about 0.25% to 25%, but not greater than a saturation amount, by weight water, about 0.1% to 30% by weight isopropylammonium dodecylbenzenesulfonate, and at least 30% by weight of a fluorochlorocarbon having a boiling point from 70° F. to 200° F. with silica gel drying agent and thereafter separating the regenerated emulsion from the silica gel.

2. The process of claim 1 wherein the flurochlorocarbon is 1,1,2-trichloro-1,2,2-trifluoroethane.

3. The process of claim 2 wherein up to 5% by weight of the emulsion is ammonia.

4. The process of claim 2 wherein the water-in-oil emulsion consists of about 6% water, 91.5% trichlorotrifluoroethane, and 2.5% isopropylammonium dodecylbenzenesulfonate.

5. The process of claim 2 wherein the contacting of said emulsion with the silica gel is carried out in a continuous operation.

References Cited

UNITED STATES PATENTS

| | | | |
|---|---|---|---|
| 2,388,616 | 11/1945 | La Lande | 210—41 |
| 2,750,041 | 9/1954 | Meyer | 210—41 |
| 2,863,830 | 12/1958 | Schneider | 260—653 X |
| 3,336,232 | 8/1967 | Bauer et al. | 252—153 |

LEON D. ROSDOL, Primary Examiner

D. L. ALBRECHT, Assistant Examiner

U.S. Cl. X.R.

210—41; 252—171, 309